May 17, 1966     G. V. SCOTT ET AL     3,251,586
PROCESS AND APPARATUS FOR INCORPORATING GASEOUS BODIES IN LIQUID
Filed April 17, 1964                   2 Sheets-Sheet 1
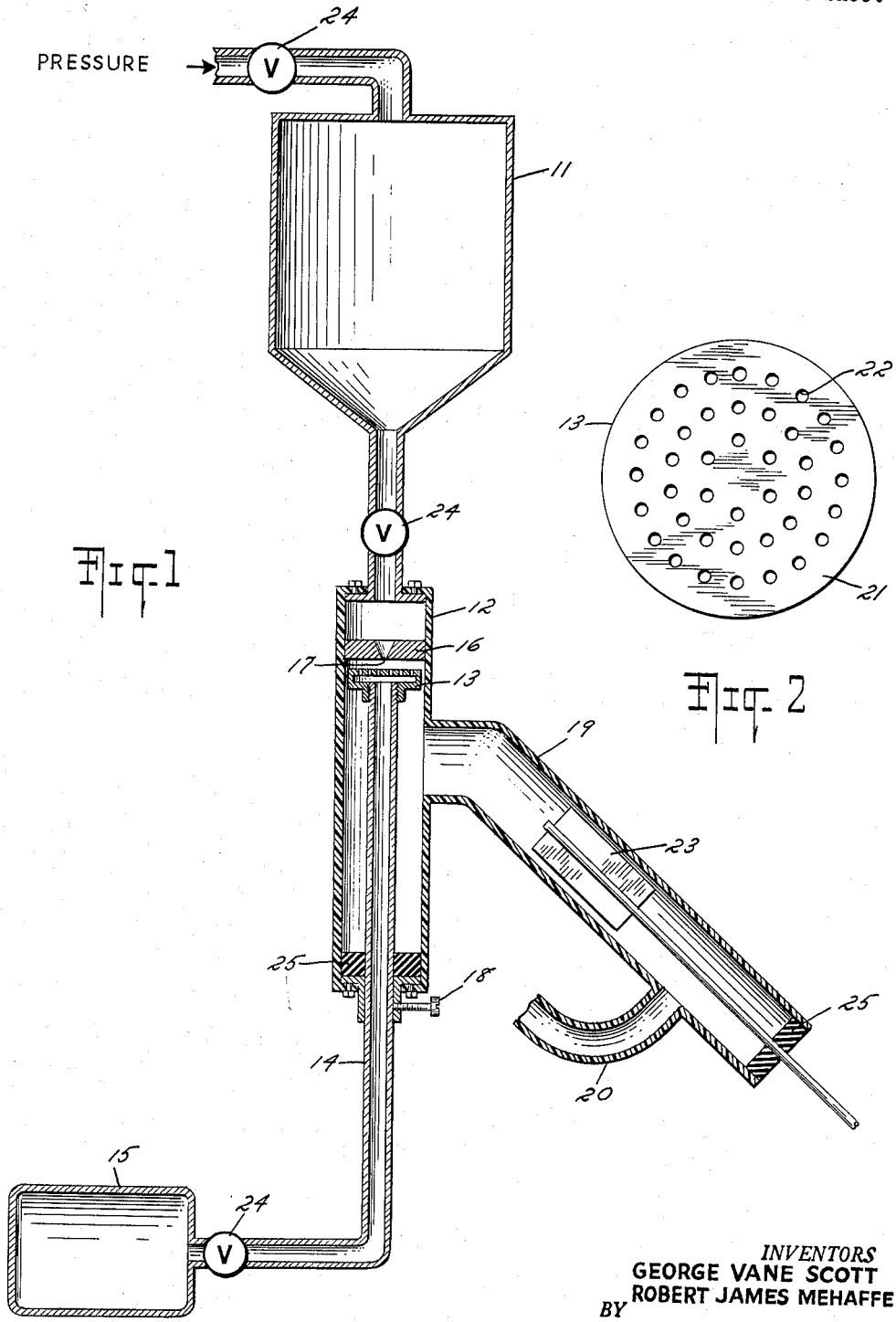
INVENTORS
GEORGE VANE SCOTT
BY ROBERT JAMES MEHAFFEY
ATTORNEY

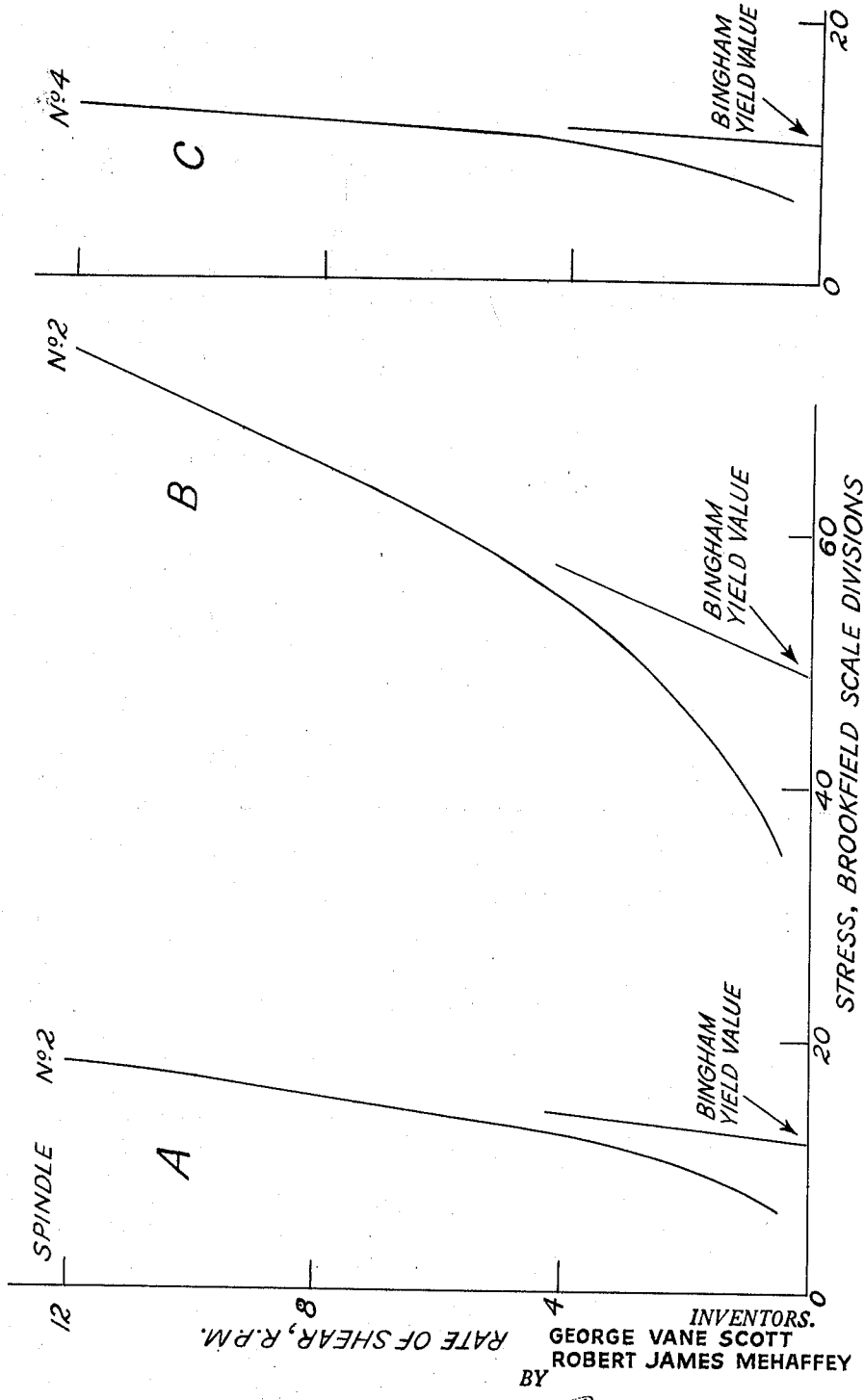

United States Patent Office 3,251,586
Patented May 17, 1966

3,251,586
PROCESS AND APPARATUS FOR INCORPORATING GASEOUS BODIES IN LIQUID
George Vane Scott, Scotch Plains, and Robert James Mehaffey, River Edge, N.J., assignors to Colgate-Palmolive Company, New York, N.Y., a corporation of Delaware
Filed Apr. 17, 1964, Ser. No. 363,323
10 Claims. (Cl. 261—76)

This application is a continuation-in-part of Serial No. 84,685, filed January 24, 1961, and now abandoned.

This invention relates to a process and apparatus for incorporating a dispersion of discrete gaseous bodies in a liquid. More particularly, the invention relates to a process and apparatus for dispersing discrete gaseous bodies in a viscous liquid so that the dispersion is substantially permanent upon aging of the liquid.

The present invention is particularly suitable for producing a liquid composition such as a cosmetic product comprising a polar solvent having a polymer dissolved therein in concentrations which form a liquid phase having a Bingham yield value and characterized by being pourable. Discrete macroscopic gaseous bodies are dispersed throughout the liquid and the Bingham yield value is controlled within limitations which maintain the gaseous bodies in suspension upon aging of the liquid. Such a liquid product exhibits a sparkling effect upon visual observation. In accordance with the present invention there is provided a process and apparatus for incorporating gaseous bodies in liquids such as those generally described hereinbelow and which is effective in controlling the size and multiplicity of the gaseous bodies in the liquid medium within a wide range.

The process, structure of the apparatus, operation and other advantageous features of the invention will be apparent from the following description taken in conjunction with the accompanying drawings in which:

FIG. 1 is a vertical sectional view of a preferred form of apparatus for accomplishing the process of the present invention;

FIG. 2 is a plan view of a means for dispersing gaseous bodies in the liquid; and FIG. 3 is a series of flow curves showing Bingham yield values of solutions typical of those used in practice of the invention.

Generally, the new process of this invention comprises flowing a viscous liquid in a stream, contacting the flowing liquid stream with a stream of gas flowing in a direction at a substantial angle to the direction of flow of the liquid stream and then mixing the gas-charged liquid.

In order to disperse the gas in the viscous liquid so that it is entrained therein substantially permanently, widely varying conditions of operation and gas and liquid of widely varying physical and chemical properties can be employed. Generally, any liquid having a Bingham yield value sufficient to overcome inherent buoyant forces of the bubbles of gas employed can be utilized in the practice of the invention. Such liquids are generally polymeric solutions and useful as cosmetic products as mentioned hereinabove. However, cosmetic liquids and the particular gases dispersed therein should not be construed as being limitative with respect to the present process and apparatus, but on the contrary, only illustrative. Any polymer or other composition may be used which will form a solution having a consistency or flow characteristics effective to retain the gaseous bodies in suspension. For the sake of simplicity, however, the present invention will be described in its relation to the preparation of polymeric cosmetic products having gaseous bodies dispersed therein.

Solutions comprising the polymers which are effective to permit the formation of and restrain the described gaseous bodies from rising to the surface of the liquid for a prolonged period of time have a practical yield point, as indicated by the presence of a Bingham yield value estimated from a flow curve. The flow curve is obtained by plotting the stress exerted at varying shear rates of the same solution of the polymer using a suitable viscometer. By extension of the straight-line portion of the flow curve to intercept the stress axis, a Bingham yield point is indicated which serves as an index of the stress at which the material will substantially flow and below which it will not substantially flow. In the instant invention, this practical yield strength acts as a restraining force which overcomes the inherent buoyant forces of the gas bodies normally tending to impel them upwardly.

The minimum concentration of the polymer should be sufficient therefore to impart a yield point effective to overcome the inherent buoyant forces generated by the gaseous bodies and maintain them in suspension, and preferably in a substantially immobile state to the naked eye, for a prolonged period of time. In general, the maximum concentration of the polymer is determined by the necessity for pourability of the liquid during the incorporation of the bubbles. The term "pourable" as used herein refers to the ability of the product to flow as a liquid under gravity at normal room temperatures (e.g., about 20° C. from a narrow-mouthed, smooth-walled container, preferably from a glass bottle having an approximate diameter of one inch or less at the narrowest part). In the event that an excessive amount of the polymer is employed, the product is converted to a jelly, paste-like or even solid mass so as to destroy the requirement for pourability during processing. The desired draining characteristics are obtained by the use of the suitable concentration of the polymer so that the liquid phase has the proper flow characteristics.

The flow characteristics influence the shape of the gaseous bodies. The yield strength of the liquid should be within the range which permits the gaseous bodies to assume a globular or substantially spheroidal shape. Where the concentration of the polymer is too high so that the product is jelly-like rather than a smooth liquid, the excessive yield strength prevents deformed bodies from becoming spheroidal so that they may be irregular in shape depending upon their size. Where the yield strength is within the proper range, the bodies assume the characteristic globular shape which is desired for the sparkling appearance, although a proportion of the bodies may temporarily be ellipsoidal in shape due to shaking or pouring of the product or other local pressures, but such bodies will tend to assume a substantially spheroidal shape upon standing.

The required flow characteristics are observable phenomena and are obtainable by the use of a suitable proportion of the polymer in the liquid phase, such as up to about 5% by weight, and preferably from about 0.05 to 1% by weight of the composition, depending upon the specific polymer used and the other ingredients present therein.

As an illustration of variations in flow characteristics, three liquid compositions were prepared which are herein described as Compositions A, B, and C. Composition B corresponding to the formulation of Example I described hereinafter has approximately 0.3% of a carboxyvinyl polymer, and is free from the gas bodies so as to determine the flow characteristics of the surrounding liquid phase. Composition A is similar but has one-half (0.15%) of the amount of the same polymer and Composition C has twice (0.6%) the polymer content. These compositions were subjected to viscosity measurements using a Brookfield rotational viscometer. FIGURE 3 sets forth the flow curves of these three compositions.

As indicated, Compositions A and B were tested using a No. 2 spindle and are on the same graph. Composition C was tested using a No. 4 spindle and its flow curve is on a separate graph. With the Brookfield viscometer, spindles of different sizes are used when testing liquids in different viscosity ranges. It is apparent from the flow curve that the three compositions have Bingham yield values, and the slopes of the curves are an indication of the mobility of the compositions after flow has been initiated. The calculated data on yield value and slope are as follows:

TABLE I

| Flow Characteristic [1] | Composition | | |
|---|---|---|---|
| | A | B | C |
| Bingham yield value (Deflection units) | 12 | 49 | 11 |
| Bingham slope (r.p.m./deflection unit) | 2 | 0.5 | 5 |

[1] Using Brookfield Model LVT5X, full scale torque (100 scale divisions: 3368.5 dyne-cm.) No. 2 spindle used on Compositions A and B and No. 4 spindle used on Composition C.

The corresponding viscosities of the composition at the various rates of shear are calculated as follows:

TABLE II

| Rate of Shear | Viscosity of Composition in Brookfield Centipoises | | |
|---|---|---|---|
| | A | B | C |
| 0.3 | 32,500 | 167,500 | 700,000 |
| 0.6 | 18,750 | 82,500 | 380,000 |
| 1.5 | 9,400 | 44,000 | 176,000 |
| 3.0 | 5,650 | 25,650 | 100,000 |
| 6.0 | 3,500 | 15,250 | 57,500 |
| 12.0 | 2,250 | 9,650 | 33,750 |

With regard to the pourability of these test solutions, Composition B is considered to have optimum pouring qualities as a fairly viscous fluid flowing in a slow stream from a narrow-mouthed container. Composition A is considerably more fluid as noted by its decreased viscosity in comparison to Composition B. Compositions A and B drain quickly in a smooth, oily continuous film from the walls of a glass container. Composition C is, in the form of large droplets, pourable within a few seconds from a container having a two-inch mouth and drains in a smooth and oily manner, but more slowly and tends to leave a heavier film.

The dispersed gaseous bodies should have a substantially globular or spheroidal shape when viewed by the naked eye and will appear to be transparent in a clear liquid phase so as to give a sparkling appearance when viewed before a light. Where the gaseous bodies are too small, they will appear as mere specks or as a flocculent precipitate or haze to the naked eye. Such condition cannot convey the impression to an observer of a sparkling effect.

The size of the gaseous bodies should be correlated with the flow characteristics of the liquid medium so that they are suspended therein. Such effects may be illustrated by measurements of the velocities of rise of gaseous bodies in the above liquid Compositions A, B, and C. With Composition A which had the lowest yield strength and a viscosity of about 32,500 centipoises at 0.3 r.p.m., it was found that gas bodies having diameters of about 2–4 millimeters rose quickly and even smaller gaseous bodies disappeared within about one month. In contrast thereto, Composition C, which had the highest yield strength and a viscosity of about 700,000 centipoises at 0.3 r.p.m., retained gaseous bodies of similar diameters in suspension to the extent that they did not exhibit any significant upward movement when examined similarly. It is considered desirable that the flow characteristics of the solution, using the same carboxyvinyl polymer or polymers having similar properties, should be selected within the range of flow characteristics exhibited by Composition A on the one hand so as to achieve sufficient stability of the gaseous bodies on aging and Composition C on the other so as to achieve pourability of the product.

As an example of the preferred product, Composition B having intermediate flow characteristics was prepared with a dispersion of gaseous bodies having diameters up to about 4 millimeters. Such product maintained the gaseous bodies in suspension and exhibited the sparkling effect after several months' aging. Examination by macrophotographic methods of a variety of gas bodies having diameters within the range of about 0.75 to 1.6 millimeters disclosed that they exhibited upward velocities of the order of $1.5 \times 10^{-3}$ millimeters per day. Such velocities are equivalent to a rise of about one millimeter per year.

The over-all sparkling appearance of the product should be maintained for a period of at least about three months as a practical consideration with respect to the possible shelf life of the product in a bottle. If the gaseous bodies rise at too fast a rate, a large part of the product will be devoid of them relatively quickly. Accordingly, the product should contain an appreciable proportion of gaseous bodies which do not rise at a rate in excess of about 0.01 millimeter per day, and preferably at a velocity from apparent zero to about .005 millimeter per day.

The minimum size of the gaseous bodies is a consideration also with respect to their stability in the liquid, in addition to the requirement that they are sufficiently large to convey the desired optical effect. The gaseous bodies which are relatively small are under higher internal pressure than larger bodies and there is a tendency for the smaller bodies to decrease in size by diffusion of gas into the liquid medium over a period of time and eventually disappear. For example, gaseous bodies composed of compressed air having diameters of the order of less than about 0.5 millimeter in Composition B tended to disappear after a period of several months, whereas examination of larger gas bodies of the order of 0.7 to 1.5 millimeters showed that they remained in suspension with only minor, if any, apparent changes in size. This effect is minimized by the use of gases which are not appreciably soluble in the liquid medium.

As indicated, the minimum diameter of a number of the gaseous bodies should be at least about 0.1 millimeter, and preferably at least about 0.5 millimeter, depending upon the gas employed, in order to convey the desired optical effects. The maximum size of the gas bodies will be less than about 8 millimeters in diameter usually, and preferably up to about 5 millimeters, and is integrated with the yield value so that they do not rise readily to the surface. It is preferred that a sufficient number of the gas bodies do not rise at a rate greater than about 0.25% per day of the height of the liquid in the container which would insure that the bulk or substantial portion of the liquid has the gaseous bodies over a period of at least about three months. It will be understood that the sizes of the gas bodies will be correlated with the flow properties of the liquid phase as previously described.

The average diameter of the gaseous bodies in the liquid may be controlled by varying the distance between the apertured plate 13 and the plug 17. If the distance is decreased, the average diameter of the gaseous bodies incorporated in the liquid will be decreased. Contrastingly, if the distance is increased, the average diameter will be increased. Additionally, if an apertured plate is used which has orifices of reduced diameter, the average diameter of the gaseous bodies in the resultant product will be decreased; and if the apertured plate has orifices of an increased diameter, the average diameter of the gaseous bodies in the liquid will be increased.

If desired, the size of the gaseous bodies in the liquid may be controlled by using an apertured plate having smaller or larger orifices and by varying the distance between the plug 17 and the apertured plate 13.

The distribution (including population) of the gaseous bodies is variable depending upon their size and the optical effect desired, but should be sufficient to impart to an observer the effect that the gaseous bodies are present by design or predetermination in order to highlight the product. It is preferred, therefore, that the gas bodies be initially dispersed in substantially all sections or general areas of the liquid phase. The distribution may be random or uniform throughout the liquid phase as desired. In general, the product contains an average of at least about one gaseous body per cubic centimeter of liquid. More particularly, it is desired that the average number of gaseous bodies be of the order of at least about two per cubic centimeter, and preferably at least about five bodies per cc. In contrast, the distribution of only a few bodies at random will not convey the over-all sparkling effect but will appear merely as some entrained bubblies or holes, particularly if the product is highly viscous. The maximum population can be varied as desired within a wide range provided that the bodies are not packed so densely that the product appears as a foam or emulsion. The liquid should be transparent (including translucent) and the gas bodies should appear to be discrete and generally not contiguous to one another. Additionally, it is preferred that the bubble population of the liquid in a transparent container be such that when looking through one side of the container to the opposite side, an observer should be able to find at least several paths through the transparent liquid which are unimpinged by bubbles.

With regard to the chemical composition of the illustrative cosmetic product, it comprises a polymer dissolved in a polar solvent which imparts the foregoing qualities to the product.

Among the polar solvents which are preferred in practicing this invention are water, acetone, alcohols containing up to about three carbon atoms, esters containing a total of up to about four carbon atoms, and the like.

Any polymer can be used which has the proper Bingham yield value in solution as set forth herein. However, the polymer which is used must not adversely affect or be affected by any of the components which constitute the final product.

In general, such polymers are synthetic, mucilaginous substances, which preferably contain carboxylic salt groups. It is preferred to employ cross-linked polymers which are produced by the polymerization or intermolecular reaction of two or more different monomers containing polyfunctional groups. The term polymer includes therefore copolymers.

Suitable examples of such polymers are disclosed in British patent specification No. 799,951, published August 13, 1958, and U.S. Patent No. 2,798,053, granted July 2, 1957. The polymers disclosed therein are compositions comprising a cross-linked interpolymer of (a) a monoolefinic monomeric material comprising at least 25% by weight of a monomeric olefinically-unsaturated carboxylic acid containing at least one activated carbon to carbon double bond such as acrylic acid, and (b) from about .01 to about 10% by weight of a polyunsaturated cross-linking agent containing a plurality of polymerizable vinyl or crotyl groups such as a polyalkenyl polyether of a polyhydric alcohol. More particularly, the preferred interpolymers are derived from a mixture of acrylic acid and a polyether of sucrose in which the hydroxyl groups which are modified are etherified with at least two allyl groups per sucrose molecule. A specific material thereof contains about 97.5 to 99.8% by weight of acrylic acid and about 2.5 to 0.2% by weight of a monomeric polyether of sucrose in which the hydroxyls are etherified with at least two, and preferable about five to about six allyl groups per sucrose molecule.

The carboxylic acid polymer should be at least partially neutralized in the polar solvent to form a suitable base in accordance with the present invention. Such carboxyvinyl polymers are available commercially in the free acid form and neutralized as required to develop the desired flow characteristics. A wide variety of bases can be used to neutralize the carboxylic acid groups of the polymer to provide satisfactory final products, usually to the extent of at least about 10% neutralization. Among the preferred neutralizing agents are ammonium hydroxide, alkylolamines such as triethanolamine and monoethanolamine; and alkali metal bases such as sodium and potassium hydroxide and carbonate. Other neutralizing agents or materials are amines such as triethylamine, triamylamine and the like. The selection of a particular salt will be influenced in part by the polar solvent medium desired since some neutralizing agents form polymeric salts which are soluble in some systems, but insoluble in others. Thus the ammonium, alkali metal, certain alkylolamine and lower aliphatic amine salts are soluble in polar mediums such as water, and various aliphatic alcohols such as glycerine, ethylene glycol and propylene glycol. It is possible to use solvents in part in which the polymeric salts are not soluble provided a sufficient quantity of a polar co-solvent is present in which the polymer is soluble.

Another type of suitable water-soluble resinous material is an ethylene maleic anhydride copolymer. It is supplied usually in anhydride form which can be hydrolyzed by heating the resin in water, and neutralizing with said neutralizing agents to the desired extent as above described.

It is preferred to have an aqueous solvent medium in the preparation of a cosmetic composition. The water is employed usually in major proportion and other materials such as the lower aliphatic water-miscible alcohols, e.g., ethyl alcohol and isopropyl alcohol, may be employed in desired amount.

The gas bodies may be formed of any suitable gas which is substantially inert. In general, the gas should not have a substantial solubility in the solvent medium so that the gas bodies do not readily dissolve into the surrounding liquid. The solubility of the suitable gases in water is usually a maximum of about 3.1% at 20° C. and atmospheric pressure. Such gases have been employed satisfactorily in products of the present invention. Examples of suitable inert inorganic gases are oxygen, nitrogen, helium, compressed air and the like. If desired, any other suitable gas may be used such as sulfur hexafluoride and perfluorocyclobutane.

The rate of flow of liquid in carrying out the process of this invention can vary widely so long as intimate contact of substantially all of the liquid by the gas is attained. The rate of liquid flow must be at least sufficient to entrap the bubbles of gas in the liquid (i.e., to sweep the bubbles from the face of the apertured plate) before the bubbles grow so large as to coalesce and form bodies of larger than desirable size. On the other hand, the rate of flow of liquid cannot be so great that a sparse population of bubbles for a given volume of liquid results. Likewise, the rate of flow of gas can be varied to achieve the desired size and population of bubbles for a particular rate of flow of liquid. It will be obvious that the rate of flow of liquid and gas will be dependent upon each other and upon the pressures at which they are introduced into the apparatus as well as the particular dimensions of the apparatus itself and are readily determinable for any particular apparatus, liquid and gas. Generally, the illustrative viscous cosmetic liquids processed in the described apparatus of the particular size limitation set out in the specific examples and contacted with the gas can be flowed in a stream at a rate of flow in a range of 500 cc./min. to 5,000 cc./min. and preferably in a range of 1,000 to 3,500 cc./min. The liquid is brought into contact with the gas which is flowing in a direction at a substantial angle to the direction of flow of liquid. In order for the flowing stream of gas to properly penetrate the liquid, it is necessary that it come into contact with the liquid at a substantial angle to the direction of flow of the liquid. If the gas is flowing in a path parallel to the stream of liquid, only the slightest contact between the two can take place. Accordingly, the stream of gas flows in a direction at an angle close to perpendicular to the direction of flow of the liquid stream and preferably at an angle of about 90° to insure good contact and penetration of liquid by the gas. The rate of flow of the gas is in a range of .5 to 25 cc./min. and preferably in a range of 5 to 20 cc./min. Although these ranges are not critical, operation within them insures attainment of a product having the desired characteristics with respect to size and population of the gaseous bodies in the liquid.

After contact of the liquid and the gas, resulting in even dispersion of the gas in the liquid, the gas-charged product is agitated to insure good distribution of gas throughout the final product. This mixing can be accomplished by mechanical agitation and subsequent folding of the liquid back upon itself or solely by agitation with a mechanical device or other suitable means. Throughout the process, temperatures may be varied within a wide range compatible with the material being used and up to the boiling points of the liquids used in practicing this invention, providing, however, that the higher temperature does not adversely affect the Bingham yield value so that the gaseous bodies would tend to rise quickly through the liquid. Additionally, the temperature at which this invention is practiced must not adversely affect any of the desirable properties of the constituents of the final product. However, it is preferred that this invention be practiced at room temperature, about 20° C.

In a preferred variation for carrying out the process of this invention, a stream of viscous liquid is flowed along a longitudinal axis and then deflected to a radial direction of flow at which point the flowing liquid stream is contacted with a stream of gas flowing in a direction at substantially a right angle to the radial flow of liquid. Subsequently, the gas-charged liquid is then mixed by agitation or the like.

Apparatus for carrying out the process of this invention in the preferred manner is shown in FIG. 1 in which numeral 11 designates a supply vessel suitable for containing liquids. The vessel is connected to a pressure reservoir (not shown) for advantageously forcing the flow of liquid through the passageway 12. Passageway 12 has means 13, such as an apertured plate, adjustably mounted therein for introducing gas into contact with the liquid. Conduit means 14 is connected to means 13 and joined to pressure tank 15 containing gas under a pressure. The apertured plate means 13 is spaced from the walls of the passageway 12 to permit liquid to flow radially over the face of the apertured plate and past the apertured plate in a longitudinal flow. A plug 16 or similar means for directing the flow of a stream of liquid having a restricted opening 17 is disposed in passageway 12 opposite the face of the apertured plate. Fluid passing through the opening 17 is accordingly flowed directly upon the face of the apertured plate. The distance between the apertured plate 13 and plug 16 can be varied by moving the conduit 14 up or down and locking it in the desired position by means of clamp screw 18 or other clamping means. Generally a distance of about $\frac{1}{32}$ in. to $\frac{1}{2}$ in. is maintained between the plug 16 and the apertured plate, thereby resulting in a layer of liquid on the apertured plate face of up to about $\frac{1}{2}$-inch thick. However, this distance may vary greatly depending upon the size of an apparatus and specific bubble size desired.

After the liquid flows across the face of the apertured plate 13, it passes between the side of the apertured plate 13 and the inner wall of the passageway 12. If the space between the side of the apertured plate and the inner wall is less than twice the average diameter of the gaseous bodies in the liquid, these bodies will tend to shear and the average diameter of the gaseous bodies will be reduced from that which is desired. Generally, the aforesaid space is preferably at least about 0.2 millimeter and may exceed 16 millimeters. However, although the aforesaid space should preferably not be less than twice the average diameter of the gaseous bodies in the liquid, it may be as large a space as desired. The maximum distance between the side of the apertured plate 13 and the inner wall of the passageway 12 is dictated only by economic considerations, such as the cost of providing a passageway 12 with a larger diameter, or the feasibility of providing an apparatus with an apertured plate having a reduced diameter. Joined to passageway 12 at a point below the apertured plate is an outlet passage 19 which has an agitator 23 associated therewith to mix the liquid and assure uniform distribution of the gas bubbles.

The liquid may be mixed in a variety of ways to assure uniform distribution of the gaseous bodies. An agitator may be disposed in the outlet passage 19. Any suitable type of agitator which would assure adequate mixing of the liquid may be used. Thus, the agitator may comprise a paddle connected to a source of power which causes it to rotate slowly. Additionally, the agitator may comprise a series of alternating upward and downward baffles extending within the outlet passage 19 and connected to the inner wall of said passage. In this manner, the liquid would be caused to flow in an undulating manner, thereby assuring even distribution of the gaseous bodies throughout.

In yet another manner of agitating, the liquid may be mixed with a rotating paddle-type agitator.

Whichever mixing means is used, the outer edge of the agitator should be spaced from the inner wall of the outlet passage 19 by a distance of from about 0.2 to 40 millimeters which is equivalent to form about two to five times the average diameter of the gaseous bodies. If the space between the outer edge of the agitator and the inner wall of the outlet passage is less than twice the average diameter of the gaseous bodies, the gaseous bodies will tend to shear, that is, their average diameter will be reduced from that which exists. Moreover, if the aforesaid space is greater than five times the average diameter, then the product may not be adequately mixed so that the product may not have a uniform distribution of gaseous bodies throughout.

The agitator used is preferably one which rotates at a speed of from 14 to 100 r.p.m. However, the speed at which the preferred agitator rotates is somewhat dependent upon the space between its outer edge and the inner wall of the passage 19. As the space increases from two to five times the average diameter of the gaseous bodies, the speed at which the paddle rotates may be increased. However, the agitator should not be operated at speeds which greatly exceed 100 revolutions due to the increased possibility of shearing the gaseous bodies.

If desired, outlet passage 19 need not necessarily be present. Instead, agitation may take place in the apparatus at any place after the gaseous bodies have been incorporated in the liquid and preferably in the apparatus close to the product's process termination point. However, it is preferred that outlet passage 19 be present.

Additionally, agitation of the gas-charged liquid may take place above the apertured plate. This may be accomplished by sealing the space between the apertured plate and the inner wall of the vessel. The gas-charged liquid would then be forced to flow above the apertured plate where an agitator would be disposed. If agitation is to take place above the apertured plate, care must be exercised to assure that the upward flow of gas-charged liquid will not interfere with the flow of liquid from the plug onto the face of the apertured plate. This may be accomplished by providing for a flow of liquid from the plug onto the face of the apertured plate in a system which is closed except for an opening to allow the gas-charged liquid to flow off the face of the apertured plate and rise upward to the agitator. The pressure of the flow through this opening is normally sufficient to prevent gas-charged liquid from flowing back into the apertured plate and plug area and thereby interfering with the flow of liquid onto the face of the apertured plate. Other suitable means to prevent backward flow into the apertured plate and plug area are obvious and will be apparent to one skilled in the art.

If agitation is to take place above the apertured plate and plug, the liquid which is uncharged with gas must be maintained separately from the gas-charged liquid. This may be accomplished by simply passing the uncharged liquid through a tube to the plug or by any other suitable means.

If desired, outlet passage 19 may have a short extension 20 disposed therein at an angle of about 40° to 80° and preferably about 60° from the longitudinal axis of the passageway 19. In this manner, the direction of flow of the liquid is changed which causes additional mixing by folding the liquid back upon itself as it flows through the passage. However, it is preferred that the outlet passage 19 and extension 20 be present as optimum results have thereby been obtained.

The extension tube 20 preferably has a diameter which is less than the diameter of the outlet passage 19 to assure that the extension tube will be constantly full of liquid product and that optimum mixing by folding back will thus occur. Valves 24 can be used where needed in the apparatus, as well as plugs or stoppers 25 of rubber or other suitable material.

The apparatus can be constructed of a wide variety of materials. Generally, the apparatus can be constructed of metal pipes, containers and the like. However, it is usually preferred that the passageway 12, outlet 19 and outlet extension 20 be constructed of Pyrex or other transparent material so that visual inspection of the product being formed is possible.

The apertured plate can be similar to those utilized in the textile field. An apertured plate of this type has a face plate 21 in which there is a plurality of orifices 22 through which gas can pass. The number of orifices in the apertured plate can vary widely. For example, a single orifice in an apertured plate or even a gas line having a single restricted outlet for introduction of gas can be utilized. On the other hand an apertured plate having a large number of orifices can also be employed so long as the orifices are not located so close to one another that the gas bubbles being formed thereby coalesce to form larger bubbles or a single large bubble.

The size of the orifices are also dependent upon the same considerations.

Generally, the diameter of the orifices may vary from about 0.025 to about .25 millimeter. If the orifices have a diameter greater than 0.25 millimeter, the gaseous bodies in the final product tend to be too large to produce a sparkling effect.

Excellent results with respect to bubble size and population are obtained in the preferred construction with an apertured plate having 40 orifices of 0.075 millimeter in diameter and distributed in three concentric rings over the face of the apertured plate which is 1.25 millimeters in diameter. It is to be understood, however, that any device capable of introducing gas to the liquid stream can be used in the practice of the instant invention so long as the liquid being charged with the gas is substantially completely contacted by the gas issuing from the device. An apertured plate such as that shown and described meets the requirements of the invention admirably well, since it has a flat face over which a stream of liquid may be flowed, thereby insuring substantially complete contact or liquid by the gas. Although the apparatus shown and described is preferred in carrying out the new process of this invention, it may be greatly varied in design so long as good contact with gas of substantially all of the liquid stream is attained. For example, passageway 12 can be disposed in a horizontal plane with respect to the apertured plate thereby directing the flow of liquid in a transverse direction across the face of the apertured plate 13 in a thin film. Where such an arrangement is employed, the apertured plate can be rectangular in shape and the orifices 22 can have a linear pattern. On the other hand, the flow of liquid can be vertical and the flow of gas transverse. It will be readily apparent that the rate of flow of liquid and/or gas will usually have to be increased to attain good dispersions when such arrangements of apparatus are employed. Suitable rates of flow can be determined for the particular structure being utilized. The population and size of the gaseous bodies can be controlled regardless of the particular design of apparatus utilized and both depend primarily upon the rate of flow of liquid and gas. In the preferred construction, a further parameter, that is, the distance between the face of the apertured plate and fluid orifice will also influence the size and population of the gaseous bodies. If desired, a multiple number of apertured plates or other orifice devices can be employed.

In operation, the apparatus performs as set out hereinafter. The liquid medium is pumped through the narrow opening 17 and is caused to flow directly upon the face 21 of the apertured plate where it is directed radially. Concurrently therewith, gas under pressure released through the orifices 22 of the apertured plate is entrained by the liquid flowing over the face of the apertured plate. The gas-charged liquid then flows off the apertured plate and is passed to outlet passage 19 where it is mixed by the agitator 23 and outlet extension 20, then subsequently collected in containers through outlet extension 20.

The following specific examples are further illustrative of the nature of the present invention, but it is to be understood that the invention is not limited thereto. The amounts of the various ingredients are by weight unless otherwise indicated.

*Examples I–III.—Cosmetic lotions*

| Ingredients | I Percent | II Percent | III Percent |
| --- | --- | --- | --- |
| Part I: | | | |
| Polyglycol | 5.0 | 5.0 | 5.0 |
| Ethyl alcohol | 8.0 | 18.0 | 8.0 |
| Non-ionic surface-active agent | 2.0 | 2.0 | 2.0 |
| Perfume oil | 0.03 | 0.03 | 0.03 |
| Ultra-violet absorber (2% alcoholic solution) | 2.0 | 2.0 | 2.0 |
| Fatty material | | | 1.0 |
| Part II: | | | |
| Unneutralized carboxyvinyl polymer (1% solution) [1] | 30.0 | 30.0 | 30.0 |
| Slip-improving agent (2% solution) | 6.0 | 6.0 | 6.0 |
| Water | 44.80 | 34.977 | 43.87 |
| Color | 0.2 | 0.023 | 0.13 |
| Part III: | | | |
| Ammonia | 0.184 | 0.184 | 0.184 |
| Water | 1.786 | 1.786 | 1.786 |

[1] Copolymer of about 99% by weight of glacial acrylic acid and about 1% by weight of polyallyl sucrose in which the sucrose molecule has an average of about 5–6 allyl groups.

Composition I having about 10% alcohol is designed for use on normal skin particularly, whereas Composition II having 20% alcohol is believed to have more pleasing effects on oily skin. Composition III differs from I in the inclusion of 1% of a fatty material, viz., monoester of coconut fatty acids and a polyethylene glycol having an average molecular weight of about 400, to improve the effect on dry skin. In the formulations, the polyglycol is a condensate of glycerine with ethylene oxide and propylene oxide having a molecular weight of about 2,600. The non-ionic surface-active agent is a fatty alcohol of 12–14 carbons condensed with about 10 moles of ethylene oxide, the slip-improving agent is a copolymer of methyl vinyl ether and maleic anhydride, and the ultraviolet absorber is 2,2',4,4' tetrahydroxybenzophenone.

The compositions are prepared by weighing the ingredients of Part I into a suitable vessel and mixing thoroughly to form a uniform solution. The ingredients of Part II are mixed together and slowly added to Part I with stirring to form a homogeneous solution. The addition of the concentrated ammonia as Part III at least partially neutralizes the carboxyvinyl polymer, and the final solution has a pH of about 6.1.

A dispersion of gaseous bodies of nitrogen was formed in each liquid using the apparatus described above wherein the solution flows upon an apertured plate which injects the gas into the liquid and then flows past the apertured plate in a space not less than twice the average diameter of the gaseous bodies into contact with an agitator which is spaced from the inner wall of the vessel by a distance of from 2 to 5 times the average diameter of the gaseous bodies. The liquids are flowed through the passageway (about 1½″ diam.) at a rate of 2000 cc./min. and the gas is introduced into contact with the liquids at 5 cc./min. through an apertured plate having 40 orifices of 0.075 millimeter in diameter and distributed in a pattern of concentric rings over the face of the apertured plate which is 1.25 millimeters in diameter. The distance between the face of the apertured plate and ⅛″ diameter fluid orifice of the plug is about ¼″. The process is carried out at about 20° C. The products contain an appreciable proportion of gaseous bodies having diameters of about 0.5 mm. to 2 mm., though there are some larger gaseous bodies dispersed therein also. The products possess a sparkling effect when viewed before a light. This optical effect is still maintained after aging of the products for 1½ years. The liquid products can be poured readily from a glass container having a mouth diameter of about 0.5 inch and drain from the walls in a smooth, oily manner.

The products are effective skin cleansing agents. The rubbing of a small portion of the products on the skin removes make-up products such as rouge, lipstick, and mascara readily. The preparations have the property of leaving the skin free from an undesirable greasy feeling and appearance so that new make-up may be applied readily without further cleansing.

*Examples IV–VI*

The formulation of Example I is repeated using substantially the same procedure except that, in place of the nitrogen, there is employed separately sulfur hexafluoride, perfluorocyclobutane and oxygen as the gases. All of the resulting products exhibited satisfactory stability, flow characteristics, and a sparkling appearance.

*Example VII*

A similar product is made using the formulation of Example I except that, in place of the described carboxyvinyl polymer, there is used an equivalent amount of a resinous copolymer of ethylene and maleic anhydride. The resulting liquid is treated with compressed air in the same manner to obtain product with the desired sparkling appearance due to the bodies of compressed air which are retained in suspension upon aging. The liquid product, when examined similarly with a Brookfield viscometer using a No. 2 spindle, has a Bingham yield value of 20, a Bingham slope of 0.8, and a viscosity of 61,500 Brookfield centipoises at a shear rate of 0.3 r.p.m.

The instant process and apparatus provide uniform dispersion of gases in viscous liquids by a relatively simple operational method which can be accomplished with relatively uncomplicated apparatus. Many other advantages of this invention will be readily apparent to those skilled in the art.

Numerous modifications of the process and apparatus of this invention can be made without departing from the spirit and scope thereof. Accordingly, the invention is not to be limited except as defined in the appended claims.

What is claimed is:

1. A process for incorporating discrete gaseous bodies in a viscous cosmetic liquid medium having a Bingham yield value sufficient to maintain gaseous bodies in suspension substantially permanently in said liquid consisting of flowing a stream of viscous solution containing about 0.05 to 1.0 percent by weight of a polymer derived from acrylic acid and a polyallyl ether of sucrose and having a Bingham yield value and a viscosity within the range corresponding to about 32,500 to about 700,000 Brookfield centipoises at a shear rate of 0.3 r.p.m. in a longitudinal direction, deflecting the flowing stream of solution to a radial direction of flow, contacting the radially flowing stream of solution with a plurality of regularly spaced streams of gas flowing in a direction at a right angle to the radial flow of solution to incorporate gaseous bodies substantially permanently in said solution, entrapping in the stream of solution a substantially specific number of gaseous bodies of substantially like size per given volume of said solution, flowing the gas-charged liquid into a chamber having an agitator disposed therein, rotating said agitator at a speed of from about 14 to 100 r.p.m., contacting said rotating agitator with said gas-charged liquid, providing clearance between the inner wall of said chamber and the outer edge of said agitator of from about 2 to 5 times the average diameter of said gaseous bodies, and flowing said gas-charged liquid past said rotating agitator, thereby mixing said gas-charged liquid without shearing said discrete gaseous bodies.

2. A process for incorporating discrete gaseous bodies in a viscous liquid medium which comprises flowing in a longitudinal direction onto the face of an apertured plate a viscous polymeric solution, having a Bingham yield value and a viscosity within the range corresponding to about 32,500 to 700,000 Brookfield centipoises at a shear rate of 0.3 r.p.m., deflecting the flowing stream of said viscous polymeric solution to a radial direction of flow across the face of said apertured plate to form a thin liquid layer up to 0.5-inch thick, contacting said thin liquid layer with a plurality of regularly spaced streams of gas which is substantially insoluble therein, incorporating in said viscous polymeric solution an average of at least one gaseous body having a diameter of from about 0.1 to 8 mm. per cubic centimeter of liquid, flowing the resultant gas-charged liquid past said apertured plate through a space of at least about 0.2 millimeter in width, flowing said gas-charged liquid into a chamber having an agitator disposed therein, rotating said agitator at a speed from about 14 to 100 r.p.m., contacting said agitator with said gas-charged liquid, providing a clearance between the inner wall of said chamber and the outer edge of said agitator of from about 0.2 to about 40 millimeters, and flowing said gas-charged liquid past said rotating agitator, thereby mixing said gas-charged liquid without shearing said discrete gaseous bodies.

3. Apparatus for incorporating discrete gaseous bodies substantially permanently in a liquid medium comprising a vessel provided with a passageway, means for introducing a flowing liquid in said passageway, an apertured plate disposed in said passageway for introducing discrete gaseous bodies in said flowing liquid, said apertured plate being spaced from the inner wall of said passageway by a distance at least equal to 2 times the average diameter of said gaseous bodies in said liquid, said apertured plate having a face horizontally disposed and having a plurality of regularly disposed orifices of from about 0.025 to about 0.25 millimeter in diameter for the passage of streams of gas therethrough, an outlet tube connected to said vessel, an agitator disposed in said outlet tube and means to operably connect said agitator thereto, the outermost edge of said agitator being spaced from the inner wall of said outlet tube a distance of from about 2 to about 5 times the average diameter of said gaseous bodies in said liquid which is flowing in said outlet tube, said agitator comprising paddles, including means to rotate said paddles at from about 14 to 100 revolutions per minute.

4. Apparatus for incorporating discrete gaseous bodies substantially permanently in a liquid medium comprising a vessel provided with a passageway, means for introducing a flowing liquid in said passageway, an apertured plate disposed in said passageway for introducing discrete gaseous bodies in said flowing liquid, said apertured plate being spaced from the inner wall of said passageway by a distance at least equal to 2 times the average diameter of said gaseous bodies in said liquid, said apertured plate having a face horizontally disposed and having a plurality of regularly disposed orifices of from about 0.025 to about 0.25 millimeter in diameter for the passage of streams of gas therethrough, an outlet tube connected to said vessel, an agitator disposed in said outlet tube and means to operably connect said agitator thereto, the outermost edge of said agitator being spaced from the inner wall of said outlet tube a distance of from about 2 to 5 times the average diameter of said gaseous bodies in said liquid which is flowing in said outlet tube, said agitator comprising paddles including means to rotate said paddles at from 14 to 100 revolutions per minute, an extension tube operably connected to said outlet tube and having a diameter smaller than the diameter of said outlet tube whereby less space is present in said extension tube than in said outlet tube.

5. Apparatus for incorporating discrete gaseous bodies substantially permanently in a liquid medium comprising a vessel provided with a passageway, an apertured plate for introducing discrete gaseous bodies disposed in said passageway and spaced from the inner wall of said passageway by a distance at least equal to about 0.2 millimeter, said apertured plate having a face horizontally disposed and having a plurality of regularly spaced orifices of from about 0.025 to about 0.25 millimeter in diameter for the passage of streams of gas therethrough, a plug having a restricted orifice for introducing a stream of liquid onto said face, said plug disposed above and opposite said face of said apertured plate, said apertured plate and said plug being spaced from one another a distance of from about 1/32 to 1/2 inch, an outlet tube connected to said vessel, an agitator disposed in said outlet tube and means to operably connect said agitator thereto, the outermost edge of said agitator being spaced from the inner wall of said outlet tube by a distance of from about 0.2 to about 40 millimeters, said agitator comprising paddles including means to rotate said paddles at from about 14 to 100 revolutions per minute, and an outlet extension tube connected to said outlet tube and disposed at an angle thereto of from about 40 to 80 degrees, said extension tube having a diameter smaller than the diameter of said outlet tube whereby less space is present in said extension tube than in said outlet tube.

6. A process for incorporating discrete gaseous bodies in a viscous liquid which comprises flowing in a longitudinal direction onto the face of an apertured plate a viscous liquid having a Bingham yield value and a viscosity within the range corresponding to about 32,500 to 700,000 Brookfield centipoises at a shear rate of 0.3 r.p.m., deflecting the flowing stream of said viscous liquid to a radial direction of flow across the face of said apertured plate, contacting said viscous liquid with a plurality of regularly spaced streams of gas which is substantially insoluble therein, incorporating gaseous bodies substantially permanently in said viscous liquid, flowing the resultant gas-charged liquid past said apertured plate through a space of at least about 0.2 millimeter in width, flowing said gas-charged liquid into a chamber having an agitator disposed therein, contacting said agitator with said gas-charged liquid, flowing said gas-charged liquid through a space between the inner wall of said chamber and the outer edge of said agitator of from about 0.2 to about 40 millimeters, thereby mixing said gas-charged liquid without shearing said gaseous bodies.

7. A process for incorporating discrete gaseous bodies in a viscous liquid which comprises flowing in a longitudinal direction onto the face of an apertured plate a viscous liquid having a Bingham yield value and a viscosity within the range corresponding to about 32,500 to 700,000 Brookfield centipoises at a shear rate of 0.3 r.p.m., deflecting the flowing stream of said viscous liquid to a radial direction of flow across the face of said apertured plate to form a thin liquid layer up to 0.5 inch thick, contacting said thin liquid layer with a plurality of regularly spaced streams of gas which is substantially insoluble therein, incorporating in said viscous liquid an average of at least one gaseous body having a diameter of from about 0.1 to about 8 mm. per cubic centimeter of liquid, flowing the resultant gas-charged liquid past said apertured plate through a space of at least about 0.2 millimeter in width, flowing said gas-charged liquid into a chamber having an agitator disposed therein, contacting said agitator with said gas-charged liquid, flowing said gas-charged liquid through a space between the inner wall of said chamber and the outer edge of said agitator of at least about 0.2 millimeter thereby mixing said gas-charged liquid without shearing said gaseous bodies.

8. A process according to claim 7 wherein said gas-charged liquid is flowed through a space between the inner wall of said chamber and the outer edge of said agitator of from about 0.2 to about 40 millimeters.

9. Apparatus for incorporating discrete gaseous bodies substantially permanently in a liquid medium comprising a vessel provided with a passageway, means for introducing a flowing liquid in said passageway, an apertured plate disposed in said passageway for introducing discrete gaseous bodies in said flowing liquid, said apertured plate being spaced from the inner wall of said passageway by a distance at least equal to two times the average diameter of said gaseous bodies in said liquid, said apertured plate having a face horizontally disposed and having a plurality of regularly disposed orifices for the passage of streams of gas therethrough, an outlet tube connected to said vessel, an agitator disposed in said outlet tube, means to operably connect said agitator thereto, the outermost edge of said agitator being spaced from the inner wall of said outlet tube a distance of from about two to about five times the average diameter of said gaseous bodies in said liquid which is flowing in said outlet tube.

10. An apparatus according to claim 9 wherein said agitator comprises paddles, including means to rotate said paddles at from about 14 to 100 revolutions per minute.

References Cited by the Examiner

UNITED STATES PATENTS

| 2,305,796 | 12/1942 | Seidel | 261—122 |
|---|---|---|---|
| 2,719,032 | 9/1955 | Schnur | 261—124 |
| 2,775,877 | 1/1957 | Bruntjen. | |
| 2,775,119 | 1/1957 | Joffe et al. | 259—4 |
| 3,011,950 | 12/1961 | Mehaffey. | |

FOREIGN PATENTS 663,974   4/1929   France.

HARRY B. THORNTON, *Primary Examiner.*
RONALD R. WEAVER, *Examiner.*